(12) United States Patent
Liongosari et al.

(10) Patent No.: US 6,996,774 B2
(45) Date of Patent: Feb. 7, 2006

(54) DISPLAY OF DATA ELEMENT INDICIA BASED ON DATA TYPES

(75) Inventors: Edy S. Liongosari, Wheeling, IL (US); Mitu Singh, Glendale Heights, IL (US)

(73) Assignee: Accenture Global Services GmbH, Schaffhausen (CH)

( * ) Notice: Subject to any disclaimer, the term of this patent is extended or adjusted under 35 U.S.C. 154(b) by 284 days.

(21) Appl. No.: 10/074,384

(22) Filed: Feb. 12, 2002

(65) Prior Publication Data

US 2005/0116953 A1    Jun. 2, 2005

(51) Int. Cl.
G06F 17/00    (2006.01)
(52) U.S. Cl. ...................... 715/517; 715/767
(58) Field of Classification Search ............... 345/440; 707/3, 4, 6, 45, 5; 705/2
See application file for complete search history.

(56) References Cited

U.S. PATENT DOCUMENTS

| | | | |
|---|---|---|---|
| 5,276,805 A * | 1/1994 | Hamaguchi | 345/537 |
| 5,499,334 A * | 3/1996 | Staab | 345/778 |
| 5,506,984 A | 4/1996 | Miller | 395/600 |
| 5,590,250 A | 12/1996 | Lamping et al. | |
| 5,608,900 A | 3/1997 | Dockter et al. | |
| 5,619,632 A * | 4/1997 | Lamping et al. | 345/441 |
| 5,644,740 A | 7/1997 | Kiuchi | 395/357 |
| 5,659,724 A | 8/1997 | Borgida et al. | |
| 5,745,895 A | 4/1998 | Bingham et al. | |
| 5,768,578 A * | 6/1998 | Kirk et al. | 707/100 |
| 5,794,257 A | 8/1998 | Liu et al. | |
| 5,801,702 A | 9/1998 | Dolan et al. | 345/357 |
| 5,949,968 A * | 9/1999 | Gentile | 1/1 |
| 5,956,688 A * | 9/1999 | Kokubo et al. | 705/1 |
| 5,983,218 A | 11/1999 | Syeda-Mahmood | |
| 6,012,055 A | 1/2000 | Campbell et al. | |
| 6,018,735 A | 1/2000 | Hunter | |
| 6,031,537 A | 2/2000 | Hugh | |

(Continued)

FOREIGN PATENT DOCUMENTS

WO    WO 97/38376    10/1997

(Continued)

OTHER PUBLICATIONS

Schneiderman, B., "Designing the user interface: Strategies for effective human-computer interaction," Reading, Addison Wesley, US, 1992, pp. 519-521, 526, XP-002210867.*

(Continued)

*Primary Examiner*—Matthew C. Bella
*Assistant Examiner*—Aaron M. Richer
(74) *Attorney, Agent, or Firm*—Brinks Hofer Gilson & Lione

(57) ABSTRACT

When displaying a plurality of data elements, region indicia, defined according to corresponding data types, are displayed. Data element indicia representative of the plurality of data elements are displayed within a plurality of regions defined by the region indicia according to the data types corresponding to each data element indicium. Additionally, relationship indicia representative of a plurality of relationships between at least a portion of the data elements may also be displayed. An initial or selected data element indicium is displayed in a focus region of the plurality of regions. At least a second data element indicium is displayed in one of the other regions. Thereafter, the second data element indicium may be selected for display in the focus region, thereby causing at least a portion of the region indicia to be redisplayed based on the second data element indicium being displayed in the focus region.

35 Claims, 9 Drawing Sheets

U.S. PATENT DOCUMENTS

| | | | |
|---|---|---|---|
| 6,035,300 A | 3/2000 | Cason et al. | 707/102 |
| 6,037,944 A | 3/2000 | Hugh | |
| 6,038,668 A | 3/2000 | Chipman et al. | |
| 6,052,693 A | 4/2000 | Smith et al. | |
| 6,141,662 A | 10/2000 | Jeyachandran | |
| 6,166,736 A | 12/2000 | Hugh | |
| 6,166,739 A | 12/2000 | Hugh | |
| 6,236,994 B1 | 5/2001 | Swartz et al. | |
| 6,256,032 B1 | 7/2001 | Hugh | |
| 6,289,353 B1 | 9/2001 | Hazlehurst | |
| 6,330,007 B1 | 12/2001 | Isreal et al. | 345/762 |
| 6,356,897 B1 | 3/2002 | Gusack | |
| 6,434,556 B1 * | 8/2002 | Levin et al. | 707/5 |
| 6,446,061 B1 | 9/2002 | Doerre et al. | |
| 6,446,076 B1 | 9/2002 | Burkey et al. | 707/102 |
| 6,487,545 B1 | 11/2002 | Wical | |
| 6,581,058 B1 | 6/2003 | Fayyad et al. | |
| 2002/0007284 A1 * | 1/2002 | Schurenberg et al. | 705/2 |

FOREIGN PATENT DOCUMENTS

| | | |
|---|---|---|
| WO | WO 98/57277 | 12/1998 |
| WO | WO 01/37120 A2 | 5/2001 |

OTHER PUBLICATIONS

XP-002210867, Chapter 15, Information Search and Visualization, E.H. Gombrich, Art and Illusion, 1959 (p. 76).

Computer Networks and ISDN Systems 28 (1996) 1027-1036, Open Information Services, Leslie Carr, Gary Hill, David De Roure, Wendy Hall, Hugh Davis.

Rennison, E., Galaxy of News, "An Approach to Visualizing and Understanding Expansive News Landscapes," pp. 3-12, Visible Language Workshop, MIT Media Lab, in USIT '94, Marina Del Rey, California, 1994.

Lamping, J., Rao, R., Pirolli, P., "A Focus+Context Technique Based on Hyperbolic Geometry for Visualizing Large Hierarchies," pp 1-16, Xerox Palo Alto Research Center, Palo Alto, CA 1995 (c) ACM.

Computer Networks and ISDN Systems 28 (1996) 1027-1036, Open Information Services, Leslie Carr, Gary Hill, David De Roure, Wendy Hall, Hugh Davis.

A. Voss, K. Nakata, M. Juhnke, "Concept Indexing," GROUP 99 Phoenix, Arizona, USA, Nov. 14-17, 1999, Copyright ACM 1999, pp. 1-10, XP002255123.

M. Lee and K. Foong, "A Knowledge Acquisition Framework for an Intelligent Decision-Support System," Proceedings of the 1994 Second Australian and New Zealand Conference on Brisbane, QLD, Australia, Nov. 29-Dec. 2, 1994, pp. 432-436, XP010136758.

N. Lavrac and I. Mozetic, "Second generation knowledge acquisition methods and their application to medicine," Deep Models for Medical Knowledge Engineering, E. Keravnou Editor, © 1992 Elsevier Science Publishers BV.

Delany, P., and Landow, G.P., "Hypermedia and Literary Studies," pp. 60-61, 71-72, 74-75, 99, 290-291; The MIT Press, Cambridge Mass. And London, England, 1991.

Findler, N.V., "Associative Networks: Representation and Use of Knowledge by Computers," pp. xv-xvi, 51-54, 62-63, 179-180; Academic Press, New York, 1979.

Date, C.J., "An Introduction to Database Systems," pp. 38-39, 48-52, 491-493, 792-797; vol. 1, Fifth Ed., Addison-Wesley System Programming Series, © 1990 Addison-Wesley Publishing Co., Inc.

Screenshots from Visio 4.0 from Microsoft Windows, © 1991-1995 Vision Corporation.

Poulovassilis, A. and Levene, M., "A Nested-Graph Model for the Representation and Manipulation of Complex Objects," pp. 35-68, ACM Transactions on Information Systems, vol. 12, No. 1, Jan. 1994.

Wang, B., Hitchcock, P., Holden, T., "Linking Object Oriented Database and Hypertext to Support Software Documentation," pp. 149-156, ACM SIGDOC'92, Proc. 10th Ann. Int. Conf. on Systems Documentation, © ACM 1992.

Baecker, H.D., "Garbage Collection for Virtual Memory Computer Systems," pp. 981-986, Comm. of the ACM, vol. 15, No. 11, Nov. 1972 © 1972, Association for Computing Machinery, Inc.

Swaminathan, K., "RA: A Memory Organization to Model the Evolution of Scientific Knowledge," pp. 23-30, 62-79, COINS Technical Report 90-80, Sep. 1990.

Halasz, F.G., Moran, T.P., Trigg, R.H., "NoteCards in a Nutshell," pp. 45-51, Proceedings of CHI'87, © 1987 ACM.

Andrews, K., "Visualising Cyberspace: Information Visualisation in the Harmony Internet Browser," pp. 97-104, Proc. Of First IEEE Symposium on Information Visualization, Atlanta, GA, Oct. 1995.

Mukherjea, S., Foley, J.D., "Visualizing the World-Wide Web with the Navigational View Builder," Computer Networks & ISDN System, Special Issue on 3rd Int. Conf. On the World-Wide Web '95, Apr. 1995, Darmstadt, Germany.

Lamping, J., Rao, R., Pirolli, P., "A Focus+Context Technique Based on Hypberbolic Geometry for Visualizing Large Hierarchies," pp. 1-8, Reprinted From: Proc. ACM SIGCHI Conf. On Human Factors in Computing Systems, Denver, May 1995, ACM.

Robertson, G.G., Mackinlay, J.D., Card. S.K., "Cone Trees: Animated 3D Visualizations of Hierarchical Information," pp. 189-193, Proc. Conf. Human Factors in Computing Systems (CHI'91) © ACM 1991.

Kumar, H.P., Plaisant, C., Shneiderman, B., "Browsing Hierarchical Data with Multi-Level Dynamic Queries and Pruning," pp. 1-6 of 24, and 22 of 24; Int. Jour. Human-Computer Stud., 1996, 46(1); URL:ftp://ftp.cs.umd.edu/pub/hcil/Reports-Abstracts-Bibliography/3474.

Hara, Y., Keller, A.M., Rathmann, P.K., Wiederhold, G., "Implementing Hypertext Database Relationships through Aggregations and Exceptions," pp. 1-4, Stanford Technical Report, 1991.

Miriyala, K., Hornick, S.W., Tamassia, R., "An Incremental Approach to Aesthetic Graph Layout," Proc. 6th Int. Workshop on Computer-Aided Software Engineering, CASE '93, 1993.

Roth, S.F., Kolojejchick, J., Mattis, J. Goldstein, J., "Interactive Graphic Design Using Automatic Presentation Knowledge," pp. 112-117 & p. 476, Proc. Of CIII'94 Conf. Boston, Apr. 1994 © 1994 ACM.

Mackinlay, J., "Automating The Design of Graphical Presentations of Relational Information," ACM, pp. 110-141, ACM Transactions on Graphics, vol. 5, No. 2, Apr. 1986.

Ichimura, S. and Matsushita, Y., "Another Dimension to Hypermedia Access," pp. 63-72, Hypertext '93 Proceedings, © ACM 1993.

* cited by examiner

DISPLAY OF DATA ELEMENT INDICIA BASED ON DATA TYPES

CROSS-REFERENCE TO RELATED APPLICATIONS

The instant application is related to prior U.S. Patent Application Ser. No. 09/520,543, entitled SYSTEM, METHOD, AND ARTICLE OF MANUFACTURE FOR A KNOWLEDGEBASE FRAMEWORK, and to prior U.S. Patent Application Ser. No. 09/520,942, entitled SYSTEM, METHOD, AND ARTICLE OF MANUFACTURE FOR ORGANIZATION MONITORING, both filed Mar. 8, 2000, the teachings of which applications are incorporated herein by this reference.

FIELD OF THE INVENTION

The present invention relates generally to computer-implemented displays and, in particular to a technique for displaying data element indicia based on data types corresponding to each data element.

BACKGROUND OF THE INVENTION

Recent advances in information technology, in particular the Internet and World Wide Web, have lead to an unprecedented growth in the amount of data generally available to a broad spectrum of users. Recently the size of the Internet has been estimated at approximately 3.2 billion pages growing at a monthly rate of 25%. Additionally, the rate of growth of private Intranets is equally significant.

As the sheer volume of available information expands, the difficultly in keeping track of newly available information, as well as the ability to discern relevant and desired information becomes increasingly difficult. For example, to do a thorough search, drug discovery scientists will typically have to access over thirty different on-line databases in the course of their normal research. In keeping with current display methodologies, each of these different databases typically relies on keyword searching and linearly presented lists of search results. More importantly, the job of tracking relationships between the data provided by each of these different sources is typically done in a manual fashion. While this approach can be effective, it is evident that significant improvements in efficiency could be realized if the vast quantities of available information could be presented in a more coherent manner.

Various attempts have been made to improve the manner in which information is presented to users. For example, U.S. Pat. Nos. 6,031,537; 6,037,944; 6,166,739; and 6,256,032 issued to Hugh describe a system in which a plurality of "thoughts" are organized in such a way that relationships between various thoughts are also included. Using a graphical representation of the resulting thought network, users are able to select individual thoughts and thereby have related thoughts displayed in a hierarchical fashion. Furthermore, U.S. Pat. Nos. 5,590,250; and 5,619,632 issued to Lamping et al. describe a system in which nodes and links between such nodes are displayed through a space having a negative curvature, i.e., a sphere. A parent node is displayed at a parent position, and other nodes having varying degrees of relationship to the parent node are displayed at other positions surrounding the parent position, thereby illustrating the network of relationships between the displayed nodes. By selecting and dragging any given node closer to the parent position, the various other related nodes are removed from or added to the displayed area in such a manner so as to provide the appearance of a sphere rotating.

The techniques described in the Hugh and Lamping patents represent an advancement in the art due, in part, to the fact that each technique provides an indication of relationships between various displayed data elements. However, neither of these techniques incorporates the use of concepts or data types to further organize the information displayed. It is believed that a technique that is capable not only of displaying relationships between data elements, but that is also capable of organizing such data elements according to data type would represent a significant advancement in the art.

SUMMARY OF THE INVENTION

The present invention provides a technique for displaying a plurality of data elements based, in part, upon data types associated with the plurality of data elements. In the context of the present invention, a data element comprises any uniquely identifiable digital object capable of manipulation by a computer or links thereto. Data element indicia comprise any visually-perceptible representation of a data element, e.g., graphical icons, video, etc. Data types associated with the data elements indicate the content encompassed by each data element. The data types, in turn, are defined according to a knowledge model representative of the available knowledge within a given line of inquiry. When displaying a plurality of data elements, region indicia, defined according to the corresponding data types, are displayed. Thereafter, data element indicia representative of the plurality of data elements are displayed within the plurality of regions defined by the region indicia according to the data types corresponding to each data element indicium. Additionally, relationship indicia representative of a plurality of relationships between at least a portion of the data elements may also be displayed. Such relationship indicia may be representative of confirmed relationships between data elements, or may be representative of potential relationships between data elements. In a presently preferred embodiment, the regions are presented as a 3×3 grid.

An initial or selected data element indicium is displayed in a focus region of the plurality of regions. At least a second data element indicium is displayed in one of the other regions relative to the focus region. Thereafter, the second data element indicium may be selected for display in the focus region, thereby causing at least a portion of the region indicia to be redisplayed based on the second data element indicium being displayed in the focus region. Also, additional data element indicia are thereby displayed based on the second data element indicium being displayed in the focus region.

DETAILED DESCRIPTION OF A PREFERRED EMBODIMENT OF THE INVENTION

Figure 1:
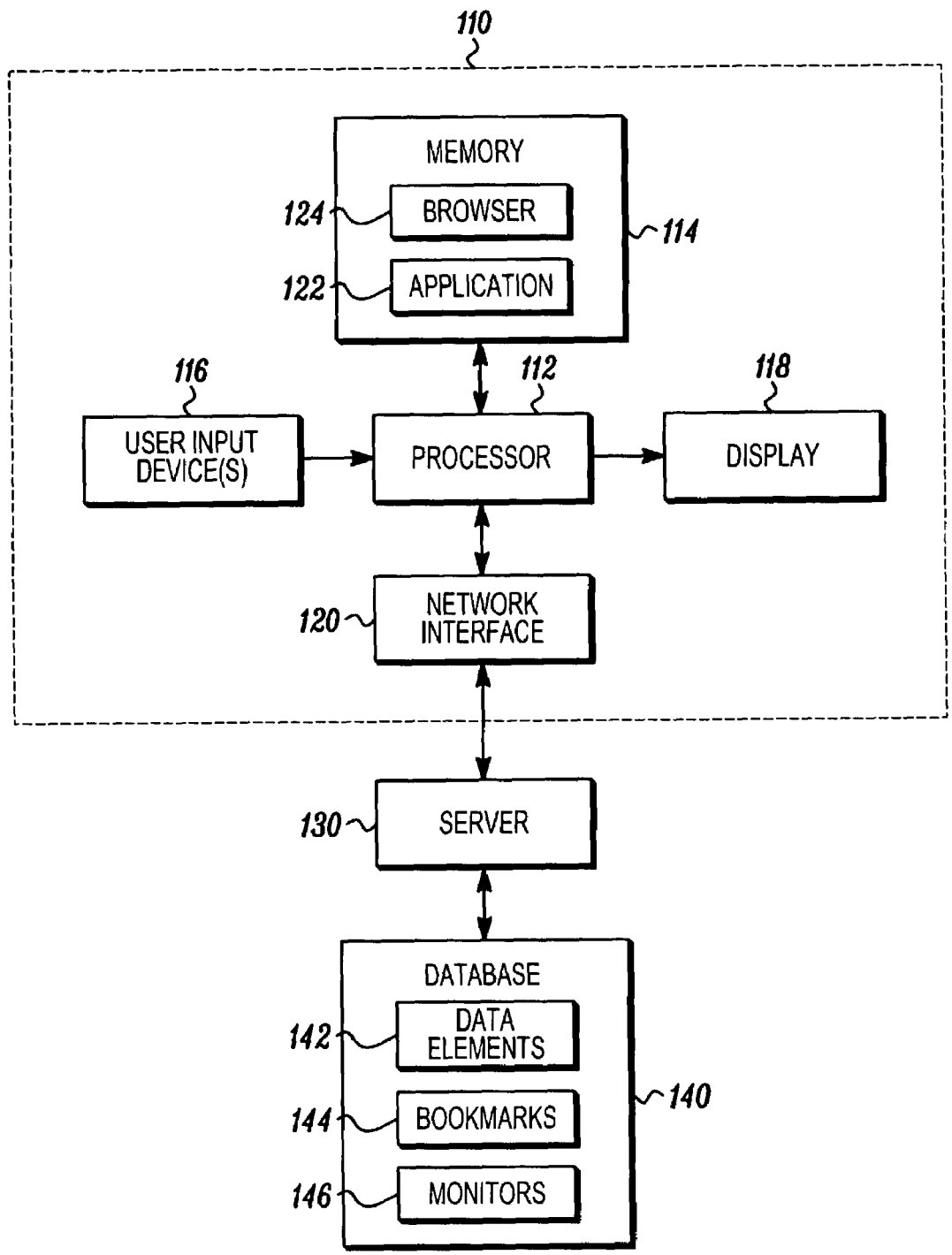
FIG. 1 illustrates a computer based system in accordance with the present invention.

The present invention may be more readily described with reference to FIGS. 1–9 below. Referring now to FIG. 1, a system 100 is illustrated comprising a computer 110 coupled to a server 130 that is in turn coupled to a database 140. In a preferred embodiment, the computer 110 is coupled to the server 130 via a public network such as the Internet or World Wide Web, or a private network such as an Intranet, or a combination thereof. The server 130 and database 140 collectively define a knowledge base framework like that described in co-pending U.S. patent application Ser. No. 09/520,543. Suitable platforms for implementing the server 130 and database 140 is well known to those having ordinary skill in the art and need not be described in greater detail here. As shown in FIG. 1, the database 140 comprises information regarding data elements 142, as well as information regarding user bookmarks 144 and monitors 146. In the context of the present invention, data elements comprise any uniquely identifiable digital objects, or links thereto, capable of manipulation and/or storage by a computer. For example, a data element may comprise, but is not limited to, text, graphics or video files as known in the art. Furthermore, rather than storing actual copies of the data elements 142 in the database 140, information indicating where such copies may be accessed (i.e., hyperlinks) may be stored in the database 140. The bookmarks 144 comprise user-provided information regarding particular data elements that a given user may wish to quickly access in the future. Additionally, the monitor information 146 comprises user-provided information regarding particular data elements for which a given user desires to receive notifications of modifications or updates.

As shown, the computer 110 comprises a processor 112 coupled to memory 114, one or more user input devices 116, a display 118, and a network interface 120. The processor 112, which may comprise a "PENTIUM" series processor along with any additional co-processors as commonly used in the art, controls the operation of the computer 110. In particular, the memory 114, which may comprise suitable nonvolatile storage such as read-only memory (ROM) and/or volatile memory, such as random access memory (RAM), stores various executable instructions and data structures in accordance with the present invention. In particular, the memory 114 comprises, in addition to an operating system and associated data structures, an application 122 that, when executed by the processor 112, provides a means for a user of the computer 110 to access the knowledge base framework embodied by the server 130 and database 140. In a presently preferred embodiment, the application 122, when executed, invokes a browser 124 such as Netscape's Navigator browser or Microsoft's Internet Explorer browser, to provide a suitable interface for communicating with the knowledge base framework. Furthermore, the application 122 is preferably written in a machine-independent language such as "JAVA" or the like.

As known in the art, the user input devices 116 may comprise a keyboard, mouse, touch pad, voice recognition, or any other mechanism typically used to provide user input to a computer. Likewise, the display 118 may comprise any type of display technology commonly found in personal computers, laptops and the like. The network interface 120 provides connectivity with the server 130 via the appropriate network and may comprise a network interface card, a modem, or any other similar devices. As described in greater detail below, the computer 110, when executing in accordance with the application 122, provides a suitable platform for implementing an interface in accordance with the present invention.

Figure 2:
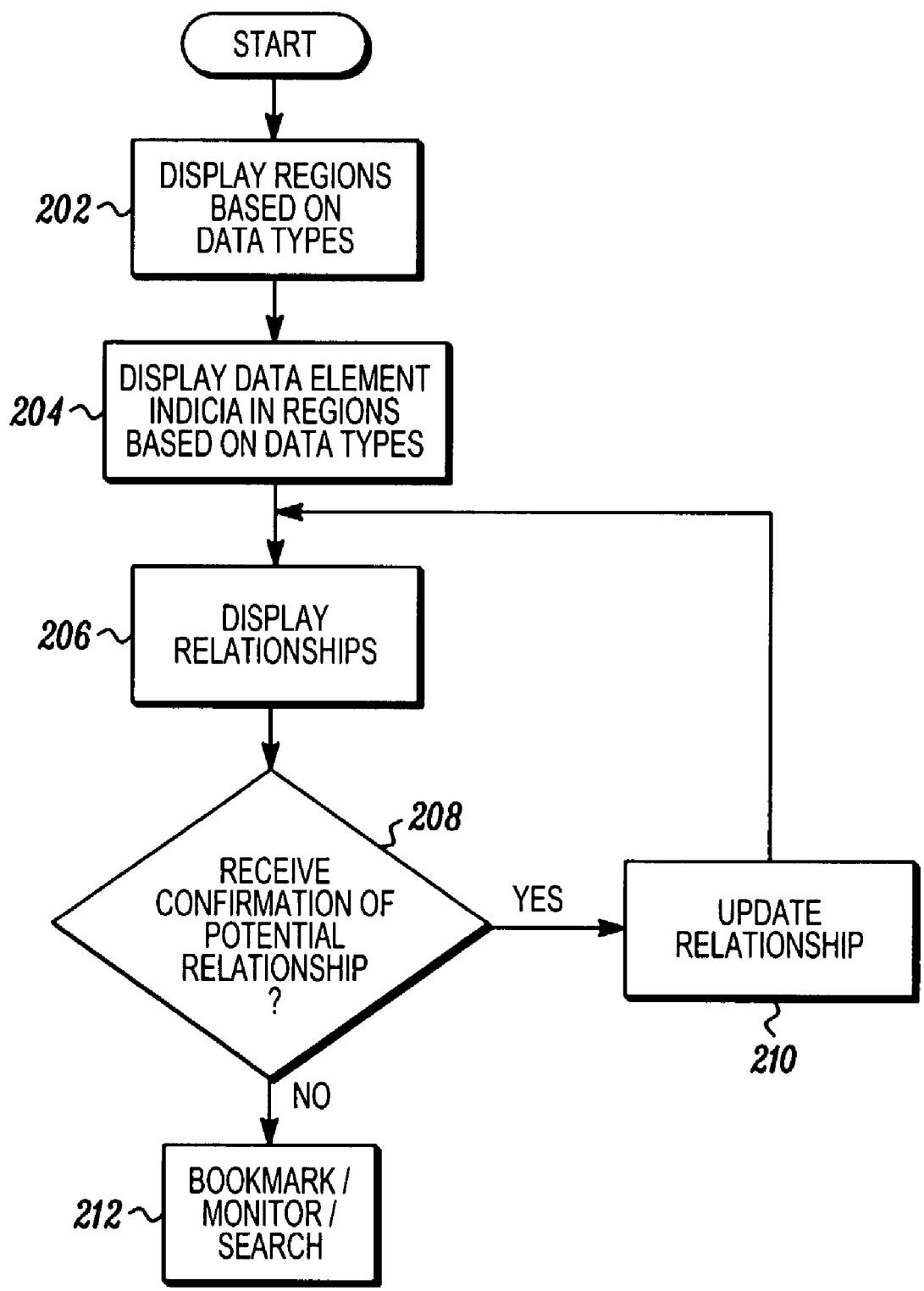
FIG. 2 illustrates a flowchart in accordance with one embodiment of the present invention.
Figure 5:
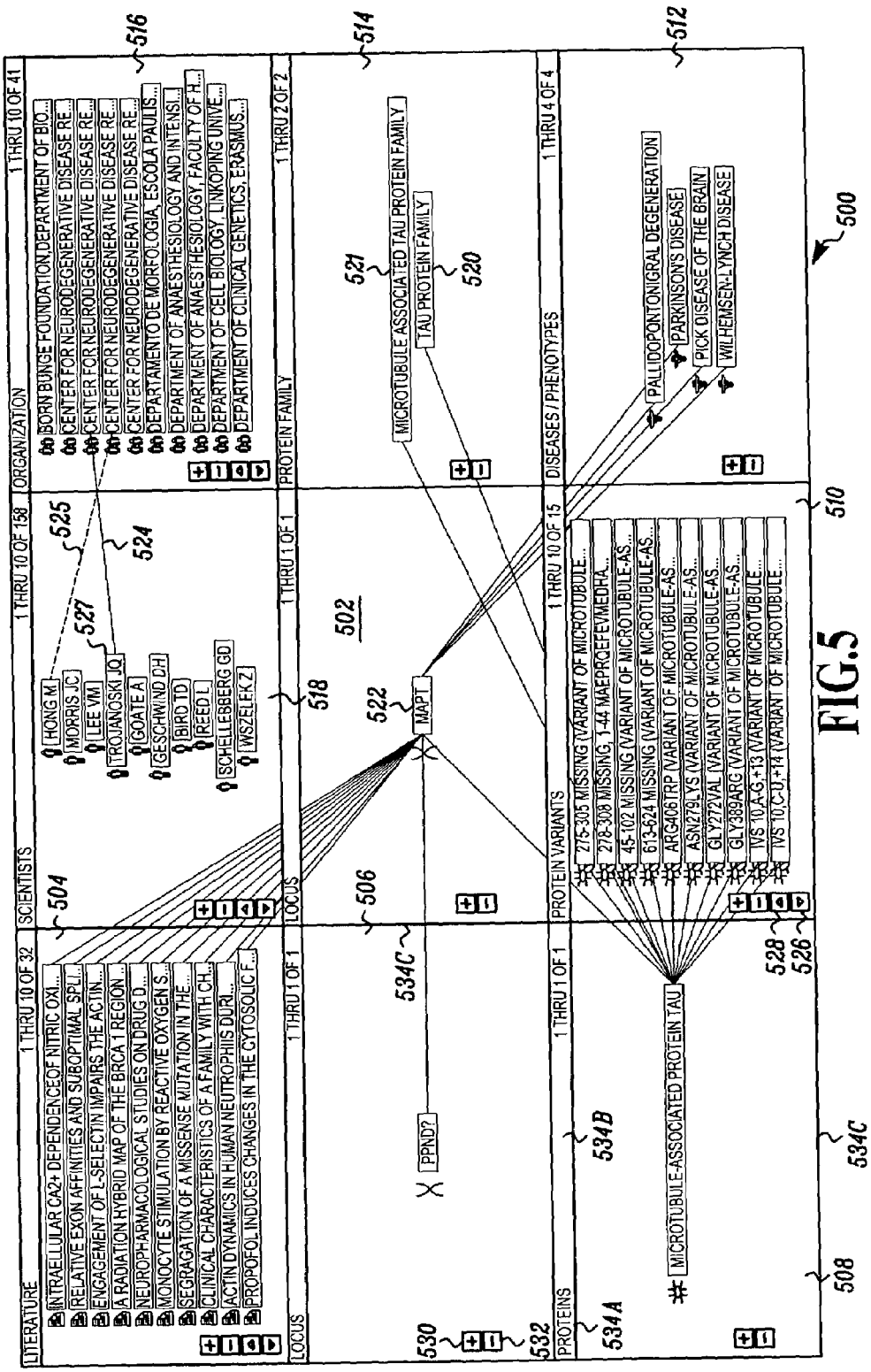
FIG. 5 is an exemplary illustration of a display in accordance with the present invention.

Referring now to FIG. 2, a flowchart illustrating a method for displaying a plurality of data elements in accordance with the present invention is provided. Preferably, the processing illustrated in FIG. 2 is carried out by the computer 110 as previously described. Beginning at block 202, a plurality of regions, as defined by region indicia, are displayed based on data types. In accordance with the present invention, a region comprises a portion of a viewable display area provided by a display. The plurality of regions may be arranged in any suitable manner, and in a preferred embodiment are arranged according to a 3×3 grid. An exemplary display (or graphic panel) 500 in accordance with a presently preferred embodiment is illustrated in FIG. 5. As shown in FIG. 5, the display 500 comprises a plurality of regions (or sub-panels) 502–518 arranged in a 3×3 grid. However, those having ordinary skill in the art will recognize that the present invention need not be limited in this manner. For example, rather than providing an n×n grid, various other dimensions may be used. The various regions are not restricted to rectangular or square shapes and may instead comprise any shape suitable for the particular application as a matter of design choice. Additionally, patterns other than a grid may be used, e.g., circular or polygonal patterns. As further shown in FIG. 5, each of the regions 502–518 is defined according to region indicia 534. In the example shown in FIG. 5, the region indicia may comprise a title 534a title bar 534b and various region borderlines 534c. Once again, those having ordinary skill in the art will recognize that other types of region indicia may be used as a matter of design choice, including variations in textures, color and shading.

Figure 4:
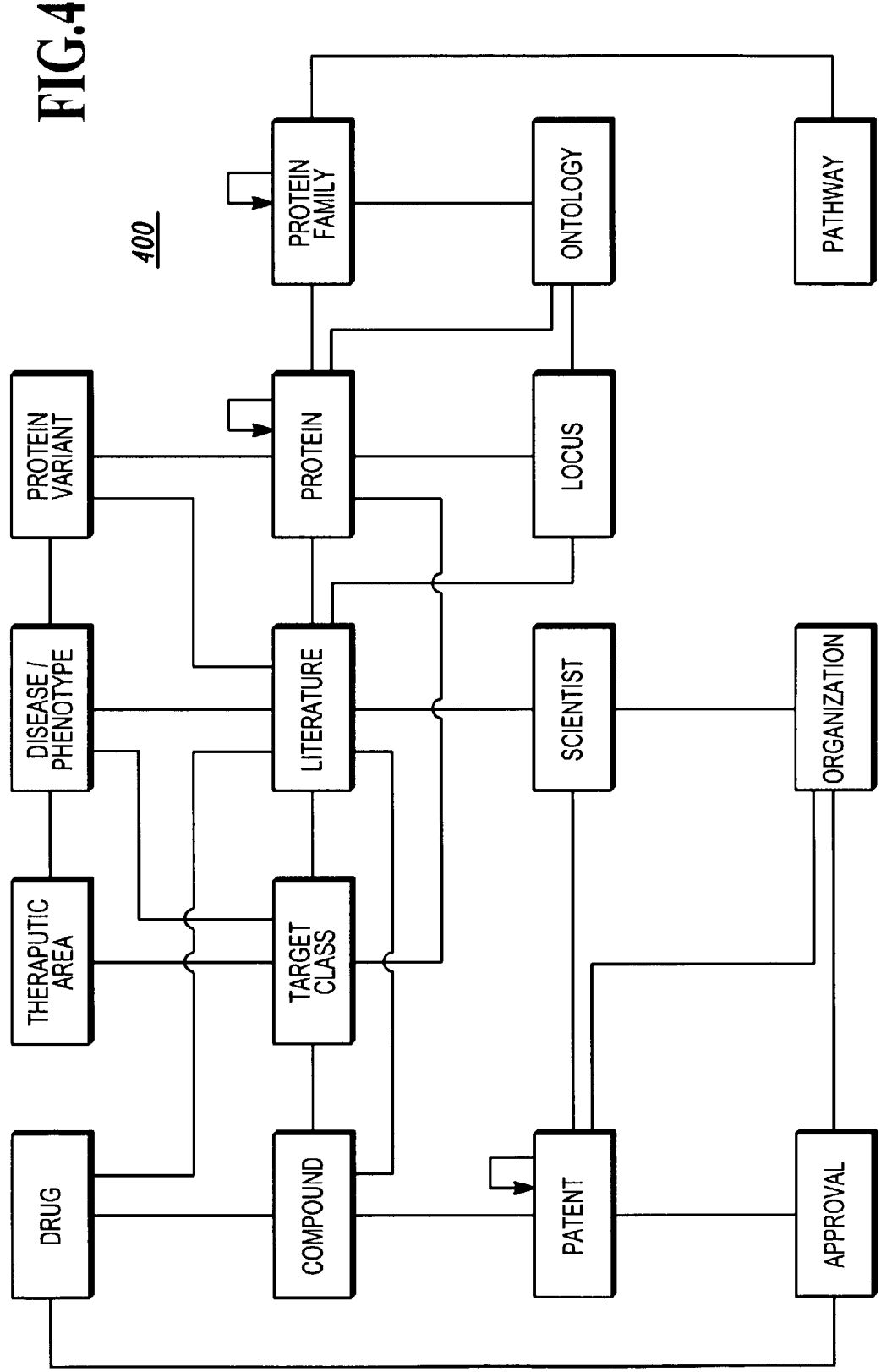
FIG. 4 is a schematic illustration of a knowledge model in accordance with the present invention.

A particular feature of the present invention is the use of data types to further organize the display of data elements. As used herein, data types are representative of the particular content or subject matter of any given data element. In a preferred embodiment, the data types are the result of a knowledge model used to organize the data elements. An exemplary knowledge model 400 is illustrated in FIG. 4. The knowledge model 400 illustrated in FIG. 4 is particularly adapted for use in drug discovery research. As shown in FIG. 4, the knowledge model 400 comprises a plurality of components or data types represented as blocks. In particular, the knowledge model 400 comprises a drug data component, a therapeutic area component, a disease/phenotype component, a protein variant component, a compound component, a target class component, a literature component, a protein component, a protein family component, a patent component, a scientist component, a locus component, an ontology component, an approval component, an organization component and finally a pathway component. The relationships between the various components illustrated in FIG. 4 are illustrated by a plurality of lines connecting each of the components. The relationships illustrated in FIG. 4 are representative of the fact that a data element falling within the realm of any given component may make reference to, and thereby be related to, at least one other data element encompassed by a different component. For example, the name of a given scientist falling within the scientist component may be associated with various articles within the literature component, with one or more patents encompassed by the patent component and may be affiliated with one or more organizations falling under the organization component. In essence, the knowledge model 400 generically represents the relationships between various components within a predefined subject area. As a result, knowledge models in accordance with the present invention are necessarily dependent upon and defined by a given field of study or inquiry. Regardless, the components illustrated in the data model may be used as the basis for data types when categorizing the plurality of data elements. It is understood, however, that the data types may be defined and organized based on techniques other than the knowledge models as described herein and the present invention is not limited in this regard.

Referring once again to FIG. 2, indicia corresponding to a plurality of data elements may be displayed in the regions based on data types at block 204. The data element indicia are preferably provided by the server 130 based on the data element information 142 stored in the database 140. Data element indicia preferably comprise any visually-perceptible representation of data elements. For example, the data element indicia having reference numerals 522 and 527 in FIG. 5 consist of descriptive graphical symbols and text strings. As previously described, each data element in a knowledge base framework is categorized according to a corresponding data type. Additionally, as described above, each of the plurality of regions provided at block 202 is likewise defined according to a corresponding data type. Thus, at block 204, data elements having a corresponding data type equivalent to the data type of a given region are displayed in that region. Referring to FIG. 5, an example of this is illustrated by the protein family region 514 and the corresponding data elements 520, 521, displayed therein. As its name would imply, the region 514 is associated with the concept or subject matter of protein families, and the data elements displayed therein are likewise associated with protein families. This is similarly repeated for each of the other regions and corresponding data types illustrated in FIG. 5. Note that the number of data elements displayed in any given region may vary greatly and is at least partly dependent upon the size of the respective regions. For example, in the central or focus region 502, a single data element indicia 522 is displayed. Conversely, in another region 510 associated with the protein variance data type, at least ten data element indicia are displayed. As shown in the title bar of the other region 510, only the first ten of fifteen possible data element indicium are displayed. In order to view the other data element indicium, up and down scroll buttons 526, 528 may be provided. As another means of displaying additional information within a given region, font increase and font decrease buttons 530, 532 may also be provided. The use in implementations of such buttons 526–532 are well known in the art and need not be described herein in further detail.

In this manner, the processing of blocks 202 and 204 provide a technique whereby a plurality of data elements may be displayed based on data types. It should be noted that although the processing of blocks 202 and 204 is represented in FIG. 2 as occurring in a predefined order, it is understood that the processing represented by blocks 202 and 204 could be undertaken in any order and in fact could be intermingled. Regardless, at block 206, relationships between at least the portion of the plurality of data element indicia may be displayed. Once again, this is illustrated in FIG. 5 where, for example, a relationship 524 is illustrated between a data element indicium in a first region 518 and another data element indicium in a second region 516. Additionally, the present invention incorporates the use of different types of relationship indicia. In particular, a relationship may be a confirmed relationship or a potential relationship. For example, the relationship indicium having reference numeral 524 is representative of a confirmed relationship; the relationship indicium having reference numeral 525 is representative of a potential relationship. Preferably, the relationship indicia used to represent confirmed relationships is visually different from the relationship indicia used to represent potential relationships. In the example of FIG. 5, this is illustrated through the use of solid versus dashed lines. Confirmed relationships refer to those instances in which it has been verified that the contents of a given data element make reference to another data element. For example, a scientific paper may make reference is a footnote or bibliography to another paper. These two papers would then have a confirmed relationship. Alternatively, potential relationships are those instances in which it is unclear whether a relationship exists between two data elements. For example, two chemical compounds frequently described together in a large number of articles are potentially related.

In the context of the present invention, potential relationships may be confirmed by users and updated accordingly. Thus, at block 208, it is determined whether a confirmation of a potential relationship has been received. That is, a user is free to view the contents corresponding to any given data element indicium and verify whether there is in fact a reference to an additional data element according to the potential relationship illustrated in the display. If a confirmation of a potential relationship is received (through the use, for example, of an appropriate user input device), the relationship is updated at block 210 and the updated relationships are thereafter redisplayed at block 206. Otherwise, processing continues at block 212 where a user may engage in any one of a number of operations. In particular, at block 212, a user may bookmark a particular data element, set a monitor for a particular data element, or initiate a search against the database of data elements. Techniques for monitoring and searching data, elements are described in copending U.S. patent application Ser. Nos. 09/520,543; and 09/520,942. With regard to bookmarks and monitors, in a presently preferred embodiment, a user can select a given displayed data element indicium (e.g., by right-clicking on the indicium when using a mouse/cursor mechanism to get a pop-up menu) to be provided with a bookmarking and/or monitoring option. Selection of the bookmarking option causes information regarding the particular data element selected to be sent to the knowledge base framework (i.e., the server 130 and the database 140), including information identifying the user and the data element being bookmarked, which information is subsequently stored. Thereafter, using a menu option or similar mechanism, the user can access his or her bookmarks to select a bookmark and have the display updated accordingly. A similar procedure is used to establish a monitor for a given data element. Thereafter, selection of that monitor (again, through a menu interface or the like) causes updated information regarding the monitored data element to be retrieved and presented for display.

As illustrated in FIG. 5, a focus region 502 may be provided as the logical and visual focal points of the display 500. A focus indicium 522 may be provided within the focus region 502 and provides the context by which the other regions 504–518 are populated with related data element indicia. In order to facilitate the exploration of a variety of data elements, the present invention allows a user to select a given data element indicium and thereby switch the focus of the display. This is further illustrated with reference to FIGS. 3 and 6.

Figure 3:
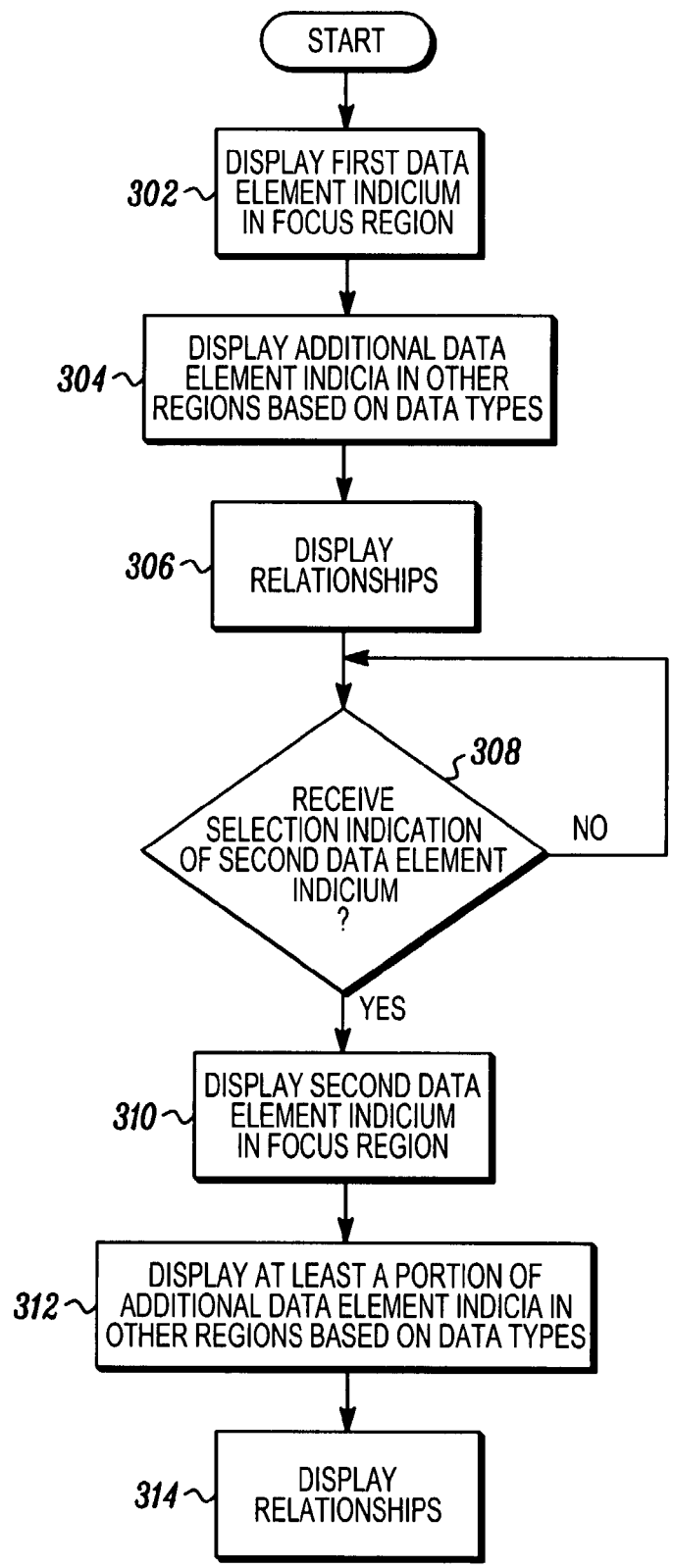
FIG. 3 illustrates a flowchart in accordance with another embodiment of the present invention.

FIG. 3 illustrates a process for displaying data element indicia in accordance with the present invention, which process is preferably carried out by the computer 110. At block 302 a first data element indicium is displayed in the focus region. In practice, if the display is being provided initially, the data element indicium provided in the focus region may be recalled from a previous session or may be retrieved based on a default value. Regardless, at block 304, additional data element indicia are displayed in other regions based on their corresponding data types. Referring once again to FIG. 5, the focus region 502 is preferably provided as the central region from within the plurality of regions 502–518. However, those having ordinary skill in the art will recognize that any of the regions could be provided as the focus region as a matter of design choice. Furthermore, although not illustrated in FIG. 5, a visual graphic or cue may be provided to further signal the focus region to a viewer of the display. For example, a unique coloring scheme or shading scheme may be used to draw a user's eye to the focus region and thereby orient the user accordingly. Regardless, at block 306 relationship indicia may be displayed as previously described relative to FIG. 2.

Thereafter at block 308, it is determined whether an indication of the selection of a second data element indicium has been received. Such would be the case, for example, where the user desires to switch focus from the first data element indicium to the second data element indicium thereby causing the display to be changed. In practice, such an indication would be generated, for example, when a user clicks on the second data element indicia (assuming a mouse/cursor mechanism) or through a similar action. When such an indication is received, the display is refreshed such that the second data element indicium is thereafter displayed in the focus region according to the processing at block 310. Thereafter, at block 312, at least a portion of the additional data element indicia is displayed in the other regions based on the corresponding data types. Note that the first data element indicium originally displayed in the focus region may also be displayed in one of the other regions based on its corresponding data type. Furthermore, when the second data element is displayed in the focus region, the data type associated with the focus region will have necessarily changed to reflect the data type associated with the second data element indicium. To reflect the change in focus, the data types associated with each of the other regions of the display may likewise change based on the fact that the second data element indicium is now displayed in the focus region. In a presently preferred embodiment, the decision as to which data types get displayed in which regions, if at all, is user controlled. That is, each user may provide configuration data (e.g., through the use of option menu selections) to indicate whether they want to see the scientist associated with the literature in the top middle or in the bottom right panel or not at all.

Figure 6:
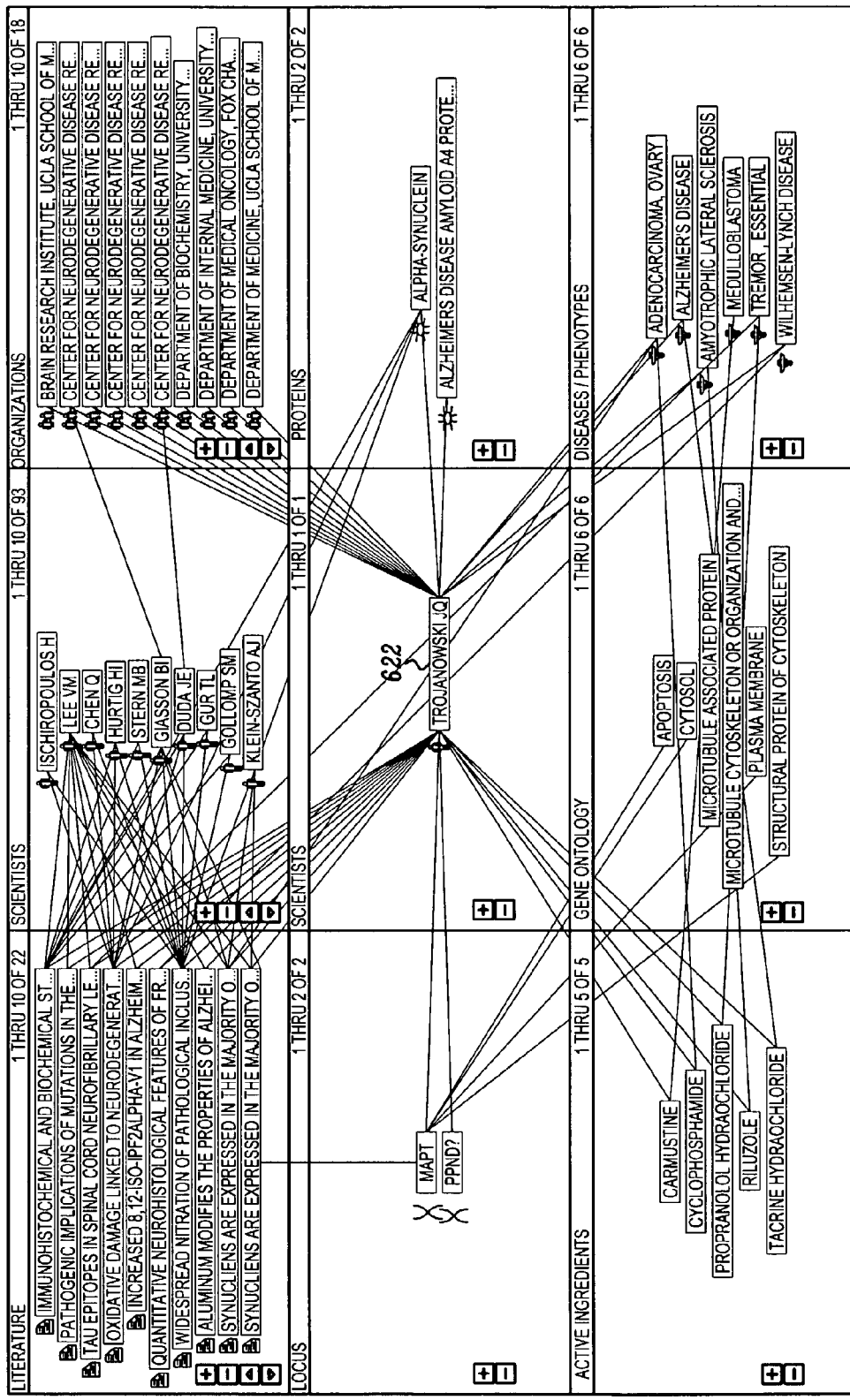
FIG. 6 is an illustration of an additional display in accordance with the present invention.

Once the display has been updated in accordance with blocks 310 and 312, processing continues at block 314 where the relationships between the data element indicia now displayed are provided. An example of the change resulting from the switch in focus described above is further illustrated with respect to FIGS. 5 and 6. In particular, referring now to FIG. 5, it is assumed that a user has selected the data element indicium having reference numeral 527 to be the new focus indicium to be displayed in the focus region 502. As a result of this selection, an updated display 600 is provided as shown in FIG. 6. As illustrated in FIG. 6, the second data element indicium in FIG. 5 (i.e., the data element indicium having reference numeral 527) is now displayed as the focus indicium 622. Note that the data type associated with the focus region now reflects the data type (scientists) associated with the new focus indicium 622. Furthermore, note that the region having associated therewith the proteins data type has moved and that two new data types, active ingredients and gene ontology, have been added to the other regions of the display. Additionally, the relationship indicia, as a result in this change in focus, have been updated to illustrate the new relationships.

In a preferred embodiment, the present invention is implemented as a software development kit (SDK). In particular, the SDK allows an application developer to add a graphical component (also referred to below as a "navigator"), in accordance with the present invention, to an application. In terms of object oriented programming, the SDK provides a generic framework of class that the developer can extend and customize (for example changing colors, events, layout, panel descriptions, tool tips, etc.). In practice, the developer adds the graphical component to their application's container and provides a starting object (or data element) for the component. Generally, the component then calls the method supplied by the developer to get the related data element indicia (or nodes) for that object. These objects are processed and displayed on the screen according to their sub-panel (region) specification. In particular, the SDK calls the developer-provided function to get the related data elements to the starting object (call it set A). When set A is about to be painted/drawn on the screen, the SDK goes through all the data elements and if they don't have a corresponding data element indicia then they are created. The data element indicia are just a graphic representation of the data element for the SDK's drawing elements.

The SDK is comprised of a plurality of functional areas (application, data and user interface) each comprising one or more classes. The application functional area provides classes used to add the graphical component to the application. It also provides classes that enable the application to change the graphical component's properties and listen to the graphical component's events. The data functional area provides a generic implementation of a data component and a generic class that represents a set or collection of data elements. Finally, the user interface functional area provides graphical classes of the graphical component. Tables 1–3 below set forth the various classes for each functional area. In the case of the data functional area, Table 2 additionally sets forth functions to be provided within one of the classes (DataObject). Note that the functionality described below assumes the use of a mouse/cursor or similar user input mechanism.

TABLE 1

| Application Class | Description |
| --- | --- |
| NavigatorApplication | This class acts as "glue" to the rest of the classes and presents a unified point for an application to access the services of the SDK. |
| NavigatorEventListener | This class provides a generic implementation of an event handler. In practice, a developer should sub-class it, provide their implementation, and send it to the NavigatorApplication. |
| NavigatorProperties | This class allows the user to set the general colors of the |

TABLE 1-continued

| Application Class | Description |
| --- | --- |
| | graphical component (i.e. background color/picture, border color, non-text node colors). The SDK creates a default instance of the properties class. The developer can get access to the default instance using a getProperties( ) method in the NavigatorApplication class. |

TABLE 2

| Data Class/Function | Description |
| --- | --- |
| DataObjectCollection | A collection class for data objects (data elements). |
| DataObject | This class is the data representation of each node (i.e., data element indicia) on the screen. The developer should sub-class it and provide implementations of the following functions: |
| getTitle( ) | Called by the SDK to get the title of the data element. |
| getDescription( ) | Called by the SDK to get the description of the data element. |
| getLeftImage( ) | Called by the SDK to get the left image, if any. |
| getRightImage( ) | Called by the SDK to get the right image, if any. |
| getRelatedNodes( ) | Called by the SDK, when a given data element is activated (e.g., selected), to get the related data elements for this instance of the DataObject. |

TABLE 3

| User Interface Class | Description |
| --- | --- |
| DescriptionPanel | This class provides tool-tip functionality. When a cursor is over some data element indicium, the SDK calls the getDescription( ) method on the DataObject (data element) corresponding to that data element indicium and displays the results using the DescriptionPanel. |
| GraphicsPanel | This class provides the core drawing/painting routines for the navigator components. It is responsible for calling getRelatedNodes on a DataObject and displaying the results. |
| ListenerPanel | This class provides a generic implementation of a cursor-movement listener class. |
| NodeCollection | This class provides a simple collection for the NodeObjects (data element indicia). |
| NodeObject | This class is the graphical representation of a DataObject, i.e., a data element indicium. It knows how to draw and animate itself and which other data element indicia it is connected to. |
| SubPanel | This class provides the region functionality of the navigator component. When the GraphicsPanel calls the getRelatedNodes method on a DataObject (data element), it goes through the collection and adds the DataObjects (data elements) to the specific panels. The panel then creates the NodeObject (data element indicia) and gives it position/animation instructions. |

Figure 7:
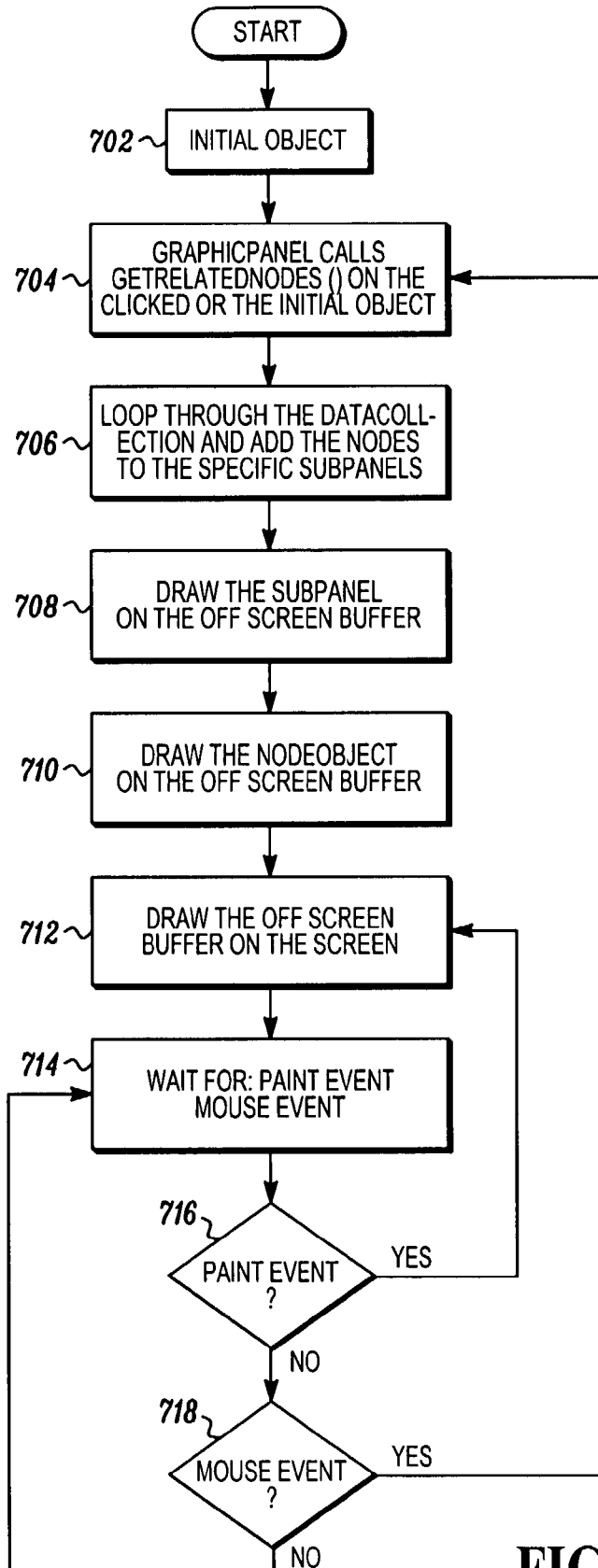
FIGS. 7–9 are flowcharts illustrating an implementation of the present invention.
Figure 8:
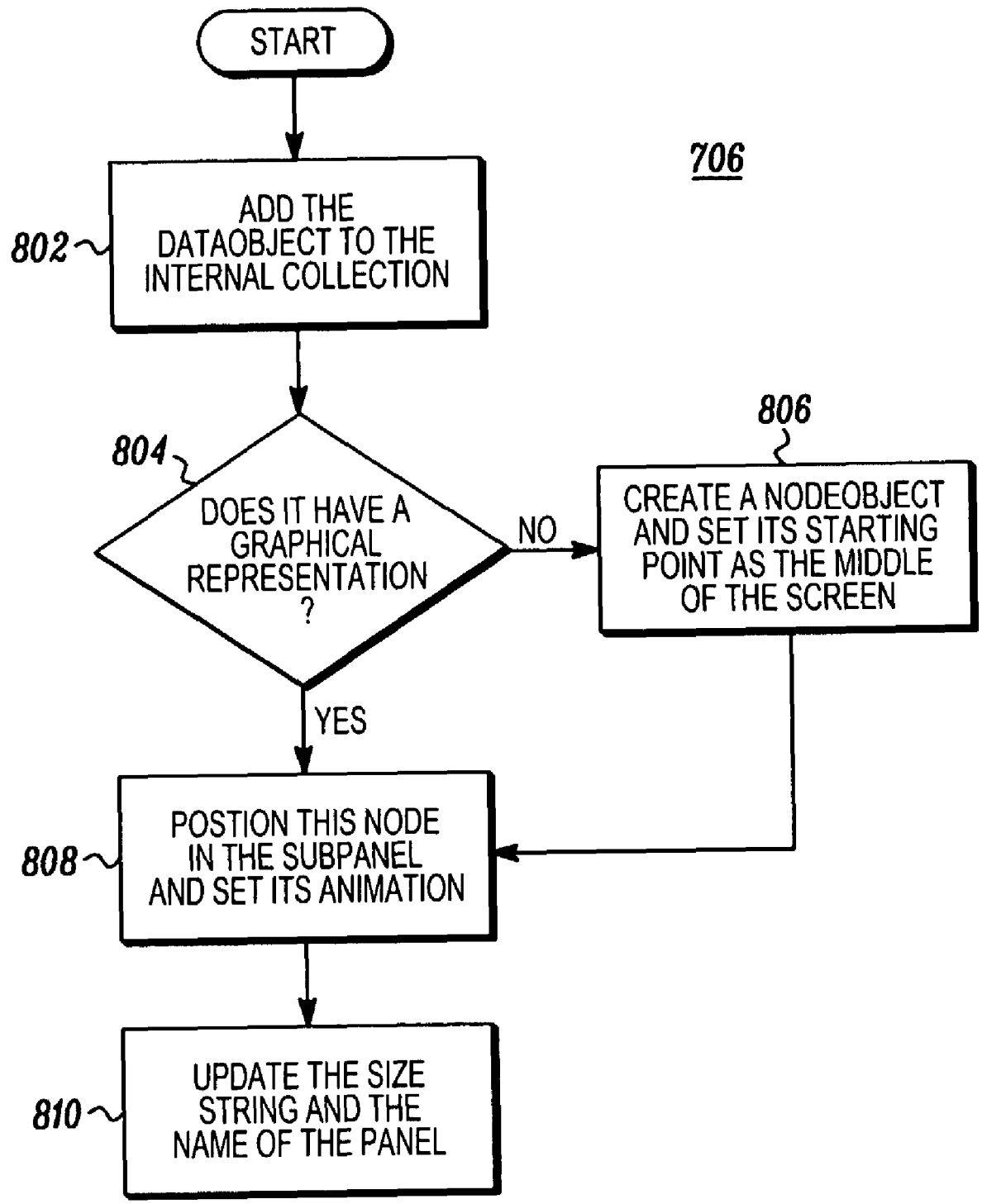
Figure 9:
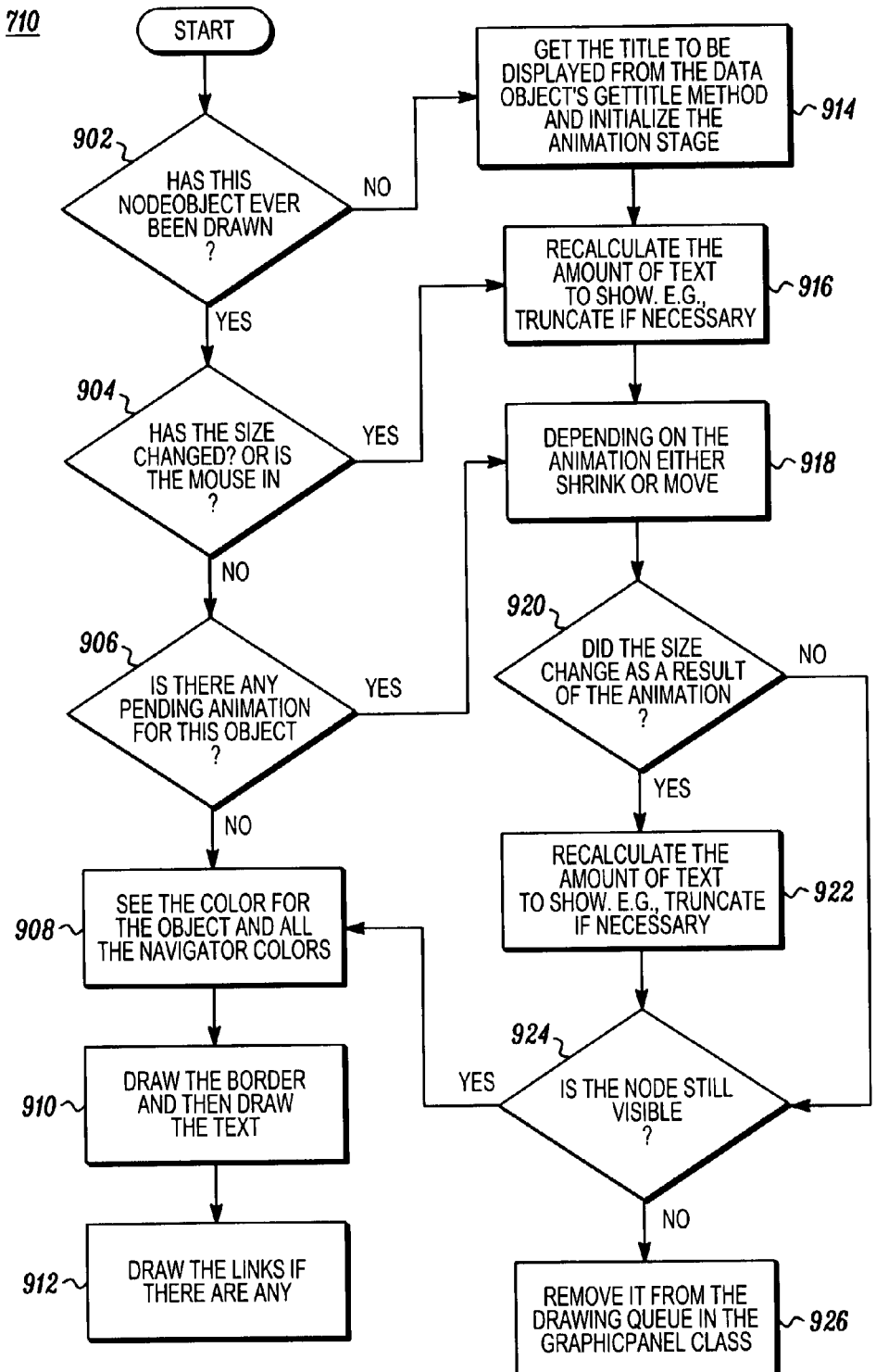

The flowcharts illustrated in FIGS. 7–9 further describe use and operation of the SDK described above. The processing illustrated in FIGS. 7–9 is carried out by the computer 110. FIG. 7 illustrates the overall process of activating a data element (object) and displaying related data element indicia (nodes). At block 702, an initial object is obtained either from the database or a static entry point for the application. The initial object is obtained either upon initiation of the graphics component or upon selection of a data element indicia corresponding to the object being obtained. At block 704, nodes related to the initial object are obtained. Using the SDK described above, the getRelatedNodes function sends a request to the database 140 which, in turn, responds with a list of related data elements as well as information regarding how the data elements are to be displayed. In particular, getRelatedNodes returns a set (DataObjectCollection) of data elements that are related to the data element on which getRelatedNodes was called. For example, if getRelatedNodes is called on a data element that represents a scientist, then the function would return a collection that might have a list of documents, other scientist who have co-authored papers with him, his organization, etc. At block 706, the list returned at block 704 is scanned to determine that specific data type corresponding to each of the returned nodes, thereby determining which sub-panels (regions) each returned node should be associated with.

At block 708, region (or sub-panel) indicia is drawn to an off-screen buffer. The use of off-screen or video buffers and techniques for drawing graphic images therein are well-known in the art and need not be described in greater detail here. Additionally, at block 710, data element indicia (and the relationships there between) corresponding to each of the regions depicted in the off-screen buffer are likewise drawn in the off-screen buffer. In this manner, an entire graphics panel (e.g., display 500) is. composed in the off-screen buffer. Thereafter, at block 712, the contents of the off-screen buffer are presented on a suitable display 118 in accordance with well-known graphics processing techniques. At this point, a display such as the one indicated in FIG. 5 is displayed on the display screen. Thereafter, at blocks 714–718, it is determined whether a paint or mouse event has been received. In the context of the present invention, a paint event is any event requiring the off-screen buffer to be redrawn to the display, and a mouse event is any event in which a new object has been selected. If a paint event occurs, the off-screen buffer is redrawn on the display at block 712. If a mouse event occurs, processing continues at block 704 based on the newly selected object.

FIG. 8 illustrates the processing of block 706 in greater detail, particularly the addition of a node to a sub-panel. At block 802, a data element (object) is added to an internal collection, i.e., data elements corresponding to a specific sub-panel. At block 804, it is determined whether the data element already has a graphical representation (data element indicium) associated therewith. If not, a data element indicium is created at block 806 using known techniques. In a presently preferred embodiment, for the purposes of animation, the starting point for the data element indicium is set as the middle of the screen so that during a drawing cycle the data element indicium will move from the center of the screen to its sub-panel position.

Once such a data element indicium has been created, or if one already existed, processing continues at block 808 where the data element indicium (node) is associated with a corresponding region (sub-panel) based on data type. Additionally, at this step, any information regarding animation of the data element indicium is set. As noted above, nodes are preferably, but not necessarily, animated during the drawing process. Currently, these animations comprise moving, growing, shrinking and collapsing. When a node is activated (i.e., selected), nodes that are already on the screen and that need to remain on the screen move to new locations; new nodes move and grow from the new active node's current position; the new active node moves to the focus region and the nodes that are no longer required on the screen will shrink and move towards the center and finally disappear. Those having ordinary skill in the art will recognized that other animation schemes may be used; the present invention is not limited in this regard. Thereafter, at block 810, the information regarding the text associated with the data element indicium as well as the region with which it is associated are updated at block 810. In this manner, regions or sub-panels may be updated in accordance with changes instigated by a user.

Finally, FIG. 9 illustrates the processing of block 710 in greater detail, particularly the drawing of a data element indicium (node) in the off-screen buffer. At block 902, it is determined whether a given data element indicium has been previously drawn. If not, at block 914, the appropriate function calls are made to retrieve the title of the data element as well as initialize animation to be associated with the data element. In particular, initialization of the animation includes setting up the font size, the position, etc, for animation.

If the data element indicium has been previously drawn, processing continues at block 904 where it is determined if the size of the data element indicium has changed, for example, as a result of animations, or if the cursor is moved over a node for which the corresponding text has been previously truncated. If so, or if processing is continuing from block 914, processing continues at block 916 where the amount of text displayed as part of the data element indicium is recalculated. In a preferred embodiment, each data element indicium may comprise a graphical image subcomponent (e.g., the outline of a person in the case of the scientist data type) and a text subcomponent (e.g., the name of the person to whom the data element indicium corresponds in the case of the scientist data type). Thus, for example, if the size of the data element indicium has changed such that it is now larger, some portion of the text subcomponent may need to be truncated. Conversely, if the data element indicium has changed such that it is now smaller, the amount of truncation needed may be reduced or eliminated altogether. In the case where the cursor moves over a node having previously truncated text, the node is expanded to show the full text for so long as the cursor remains over the node.

If, after determining that the data element indicium has not changed in size, processing continues at block 906 where it is determined if there is any pending animation for the data element. In practice, animation is done in frames. So, for a "move" animation, a object moves a small increment on frame 1, another small increment on the next frame, etc.

Therefore if the object has not reached the final destination it will still have pending animation operations. If so, or if processing is continuing from block 916, processing continues at block 918 where the data element indicium representative of the data element is reduced in size or moved based on the pending animation corresponding thereto. Thereafter, processing nearly equivalent to blocks 904 and 916 is executed at blocks 920 and 922, i.e., recalculating the amount of text to be displayed if the size of the data element indicium has changed as a result of the animation. If the size has not changed, processing continues at block 924 where it is determined if the data element indicia is still visible. Because of the animation that occurred, it is possible that the data element indicium corresponding to the data element may no longer be visible. If not, the data element indicium is removed from off-screen buffer and from the class representative of the graphic panel (display).

If the data element indicium is still visible despite the animation, or if there was no pending animation at block 906, processing continues at block 908 where the colors for the data element indicium as well as the region indicia are set according to a predetermined format. In a preferred embodiment, a user can change all of the colors in the navigator. Color for the node is the color that is used to display the text, whereas navigator colors are the color for the border of a node, the link color, the background color, etc. Thereafter, at block 910, the border defining the node and it corresponding text are drawn and, at block 912, the relationship indicia are also drawn. To this end, the getLeftImage function, to retrieve the symbol used to represent the node, and getRightImage function, to retrieve the text to be displayed, are called at block 910.

The present invention overcomes the limitations of prior art methodologies by not only data element indicia and corresponding relationships there between, but by doing so based on data types. To this end, a plurality of regions are defined based on a corresponding plurality of data types, and region indicia are displayed accordingly. Data element indicia are displayed in the plurality of regions based on matching data types of the data element indicia and the plurality of regions. Relationships between the data element indicia, which relationships are user modifiable, may likewise be displayed. A selected data element indicium is preferably displayed in a focus region of the plurality of regions, and subsequent selections of other data element indicia for display in the focus region causes the plurality of regions, and the data element indicia displayed therein, to be updated accordingly. In the manner, the present invention provides an improved technique for displaying information.

The foregoing description of a preferred embodiment of the invention has been presented for purposes of illustration and description, it is not intended to be exhaustive or to limit invention to the precise form disclosed. The description was selected to best explain the principles of the invention and practical application of these principles to enable others skilled in the art to best utilize the invention and various embodiments, and various modifications as are suited to the particular use contemplated. It is intended that the scope of the invention not be limited by the specification, but be defined by the claims set forth below.

What is claimed is:

1. In a computer comprising a display, a method for displaying data element indicia representative of a plurality of data elements that are interrelated by a plurality of relationships, the method comprising:

displaying on the display a plurality of visibly separated regions, wherein each of the regions is defined by region indicia and is representative of a different one of a plurality of corresponding data types that are interrelated within a predestined subject area, wherein each of the data types is a descriptive category that is displayed in one of the regions;

categorizing a plurality of unassociated data elements to be included in the regions based on one of the data types home associated with each of the data elements, wherein categorization is based on the descriptive category that describes the content or subject matter of the data elements;

displaying on the display a plurality of data element indicia positioned in the regions, wherein each indicium of the data element indicia is representative of a data element that is categorized to be displayed in the corresponding region; and displaying on the display a relationship only between data element indicia positioned in different regions.

2. The method of claim 1, wherein displaying on the display a plurality of regions comprises displaying on the display an indication of the data type of each of the corresponding regions.

3. The method of claim 1, wherein displaying on the display a relationship between data element indicia comprises indicating on the display a confirmed relationship between a plurality of related data elements.

4. The method of claim 1, wherein displaying on the display a relationship between data element indicia comprises indicating on the display a relationship between a plurality of potentially related data elements.

5. The method of claim 4, wherein indicating on the display a relationship between potentially related data elements comprises:
receiving an indication confirming an unverified relationship between indicia representative of wholly unique, otherwise unassociated data elements; and
converting the unverified relationship to a relationship representative of a confirmed relationship.

6. The method of claim 1, wherein displaying on the display a relationship between data element indicia comprises, displaying on the display verified relationships only between indicia in different regions with a first relationship indicia and displaying on the display unverified relationships only between indicia in different regions with a second relationship indicia that is visually different from the first relationship indicia.

7. The method of claim 6, further comprising enabling the capability to convert an unverified relationship to a verified relationship.

8. The method of claim 1, wherein displaying on the display comprises identifying common subject matter between a plurality of data elements.

9. The method of claim 1, further comprising:
displaying on the display a focus region defined by region indicia that includes only a single first indicium of the data element indicia as a focus indicium, wherein the regions are displayed on the display based on the focus region and the first indicium; and
displaying on the display a plurality of relationships to other indicia relative to the first indicium.

10. The method of claim 9, further comprising:
receiving a selection indication representative of selection of a second indicium of the data element indicia as the focus indicium, wherein the second indicium is positioned in a first region with other data element indicia;
reconfiguring the regions on the display based on the selection of the second indicium;
replacing the first indicium with the second indicium in the focus region of the display; and
displaying the relationships to the other indicia relative to the second indicium.

11. The method of claim 9, wherein displaying a first indicium comprises displaying only the first indicium in a central region of the display that is defined by region indicia.

12. The method of claim 1, wherein categorizing a plurality of unassociated data elements comprises selecting the associated data type from a plurality of data types that have been defined, organized and stored in a database.

13. The method of claim 12, wherein the data types have been defined, organized and stored in the database with a knowledge model.

14. The method of claim 1, wherein the data elements comprise at least one of a text file, a graphics file, or a video file or combinations thereof.

15. The method of claim 1, wherein categorizing a plurality of unassociated data elements comprises searching a database for one of the data elements or data element access information that is stored in the database.

16. In a computer comprising a display, a method for displaying data element indicia representative of a plurality of data elements that are interrelated by a plurality of relationships, the method comprising:
identifying a subject area and a corresponding plurality of interrelated data types;
categorizing a plurality of unassociated data elements to be included in at least one of the data types, wherein the data elements comprise at least one of a text file, a graphics file, or a video file or combinations thereof, and categorization is based on the content or subject matter included within each of the files,
wherein the data types describe the content or subject matter encompassed in the data elements to be categorized therein;
generating a focus region in a display that is defined by region indicia and includes a representation of only one of the data elements and a data type descriptive of the one of the data elements;
generating a plurality of associated regions in the display, wherein each of the associated regions is defined by region indicia and is indicated in the display to be representative of one of the data types;
displaying in the display a representation of each of the data elements in at least one of the associated regions that correspond to the data type into which each of the data elements were categorized; and
indicating in the display a relationship only between individual data elements in different regions and not between data elements in the same regions.

17. The method of claim 16, wherein identifying a subject area comprises, selecting the one of the data elements that is represented in the focus region from a group of representations of data elements displayed in one of the associated regions.

18. The method of claim 16, wherein categorizing a plurality of data elements comprises scanning each of the data elements to determine a specific data type corresponding thereto.

19. The method of claim 16, wherein displaying in the display a representation of each of the data elements comprises determining which of (the associated regions each of the data elements are associated with.

20. The method of claim 16, wherein displaying in the display a representation of each of the data elements comprises representing each of the data elements individually with a visually perceptible representation.

21. The method of claim 16, wherein generating a focus region comprises providing a context by which the associated regions are generated and displayed.

22. The method of claim 16, wherein generating a plurality of associated regions in the display comprises defining a pattern of visually perceptible panels, wherein each of the panels is an associated region.

23. The method of claim 16, wherein displaying in the display a representation of each of the data elements comprises retrieving a displayable graphical representation of each of the data elements from a database.

24. The method of claim 23, wherein displaying on the display a plurality of data elements comprises creating a displayable graphical representation of a data element when a displayable graphical representation of the data element does not exist in the database.

25. The method of claim 16, wherein displaying in the display a representation of each of the data elements comprises retrieving from a database a title to display in the display for each of the data elements.

26. The method of claim 16, wherein generating a plurality of associated regions comprises determining the regions based on the data types that are represented with the data elements.

27. The method of claim 16, wherein categorizing a plurality of unassociated data elements comprises organizing the data elements with a knowledge model by association with a data type.

28. An apparatus for displaying data element indicia representative of a plurality of data elements interrelated by a plurality of relationships, the apparatus comprising:
a display;
a processor coupled to the display; and
a memory device, coupled to the processor, the memory device comprising:
instructions executable by the processor to display on the display a plurality of visibly separated regions, wherein each of the regions is defined by region indicia and is representative of one of a plurality of data types that are interrelated by a pre-defined subject area;
instructions executable by the processor to categorize a plurality of unassociated data elements to be included in the regions based on a data type associated with each of the data elements chat is indicative of the content encompassed by the respective data elements;
instructions executable by the processor to display on the display a plurality of data element indicia that are positioned in the regions, wherein each indicium of the data element indicia is representative of a data element that is categorized to be displayed in the corresponding region, and wherein the data types are displayable in the respective regions to describe the content or subject matter of the data element categorized to be displayed therein; and
instructions executable by the processor to display on the display a relationship between only the data element indicia that are positioned in different regions.

29. The apparatus of claim 28, further comprising a user input device coupled to the processor, and wherein the memory device farther comprises instructions executable by the processor to receive, via the user input device, confirmation of a selected relationship between individual indicia that is represented as a potential relationship, wherein each of the individual indicia are representative of wholly unique, otherwise unassociated data elements; and
instructions executable by the processor to convert the selected relationship between the individual indicia to a relationship represented as a confirmed relationship.

30. The apparatus of claim 28, wherein the regions define a visually perceptible grid pattern.

31. The apparatus of claim 28, wherein the memory device further comprises:
instructions executable by the processor to display on the display a first region defined by region indicia tat includes a single first indicium of the data element indicia as a focus indicium, wherein the regions are displayed based on the first indicium and wherein the first indicium was previously positioned in one of the regions; and
instructions executable by the processor to display on the display a plurality of relationships between other data element indicia and the first indicium.

32. The apparatus of claim 31, further comprising a user input device coupled to the processor, and wherein the memory device further comprises:
instructions executable by the processor to receive, via the user input device, a selection of a single second indicium of the data element indicia as the focus indicium;
instructions executable by the processor to reconfigure on the display the regions and the second indicium to be displayed in the first region; and
instructions executable by the processor to display on the display the relationship indicia relative to the second indicium.

33. The apparatus of claim 28, wherein the executable instructions form a part of a browser application stored in the memory device.

34. The apparatus of claim 28, wherein each of the data elements are a uniquely identifiable digital object capable of manipulation and storage in the memory device by the processor.

35. The apparatus of claim 28, wherein the region indicia comprise a tide indicative of the data type and a region borderline.

* * * * *

UNITED STATES PATENT AND TRADEMARK OFFICE
CERTIFICATE OF CORRECTION

PATENT NO. : 6,996,774 B2
DATED : February 7, 2006
INVENTOR(S) : Edy S. Liongosari and Mitu Singh It is certified that error appears in the above-identified patent and that said Letters Patent is hereby corrected as shown below:

<u>Column 15,</u>
Line 48, delete "chat" and insert -- that --.

<u>Column 16,</u>
Line 9, delete "farther" and insert -- further --.
Line 23, delete "tat" and insert -- that --.
Line 52, delete "tide" and insert -- title --.

Signed and Sealed this

Eleventh Day of April, 2006

JON W. DUDAS
*Director of the United States Patent and Trademark Office*